INVENTORS:
PETER RIECKMANN
HEINZ SCHALK
ECKHARD THEEL
BY Burgess, Dinklage & Sprung
ATTORNEYS

United States Patent Office 3,381,659
Patented May 7, 1968

3,381,659
DRAGÉE PREPARATION AND
APPARATUS THEREFOR
Peter Rieckmann, Mannheim-Waldhof, Heinz Schalk, Mannheim, and Eckhard Theel, Mannheim-Sandhofen, Germany, assignors to C. F. Boehringer & Soehne G.m.b.H., a corporation of Germany
Continuation-in-part of application Ser. No. 331,639, Dec. 5, 1963, which is a division of application Ser. No. 252,275, Jan. 16, 1963. This application Dec. 29, 1966, Ser. No. 605,648
Claims priority, application Germany, Jan. 20, 1962, B 65,598
4 Claims. (Cl. 118—19)

ABSTRACT OF THE DISCLOSURE

Improvements in the apparatus for use in the automatic production of dragées comprising a rotatable coating kettle for holding pill centers to be coated, spray means for delivering coating suspension from a supply tank onto said pill centers, means for delivering heated gas onto said pill centers and means for exhausting heated gas, the improvement in combining the aforesaid components with a gear pump, a safety valve, a solenoid steered three-way valve and specifically associated conduits interrelating them all so that the spraying period, the inactive period and the drying period are automatically controlled, the amount of suspension to be delivered being directly controlled by the control of the spraying period.

---

The instant application is a continuation-in-part of application Ser. No. 331,639 filed Dec. 5, 1963 and now abandoned which is a division of application Ser. No. 252,275, filed Jan. 16, 1963 and now abandoned.

The present invention relates to a process for the manufacture of dragées and to an apparatus therefor. In one aspect it relates to an automatic process for rapidly manufacturing pharmaceutically acceptable dragées.

It is known that the dragée represents one of the most wide-spread forms in which drugs are administered, and that the administration of drugs in this form is growing in popularity. Dragée preparations are characterized by the advantages that they are easy to ingest and eliminate the bad taste which is characteristic of so many drugs. Furthermore, the dragée is a particularly important vehicle for use in connection with drugs which are sensitive to light, air, and moisture. Still further in the case of drugs which have a disturbing effect on the stomach or which are inactivated in the stomach, special coatings can be applied so that the dragée will not dissolve until it reaches the intestines, resulting in excellent tolerability and permitting the oral administration of drugs not possible in the absence of such coatings.

The manufacture of dragées suitable for commercial utilization involves many difficulties. As heretofore carried out, it is a manual art requiring much practice, skill, and experience. The pill or center coming from the tablet forming machine has first applied thereto where necessary, isolation coatings which act to protect the pharmaceutical substances from external influences. The pill or center is then coated with a sugar syrup of a certain composition and thereafter with mixtures of talc, chalk and like solid fillers. This process has to be repeated several times in order to apply to the pill as quickly as possible sufficient material to produce on the dragée, edges which are rounded. However, the surface of the pill so obtained is not smooth and has to be smoothed out in further steps, using therefor both sugar syrups and powdered sugar. The smoothing step is followed by coloring steps, whereby a uniformly colored dragée is achieved only following the application of many coats of colored sugar syrup. Finally the dragées are waxed or glazed. Between each of the individual steps in the process, the dragées are taken from the coating treatment kettle and dried in large drying machines or ovens so that the moisture necessary in connection with the coating applications cannot penetrate through the covering and damage the drugs forming the center or core.

The process as described above requires a great deal of hand work by experienced personnel. A particularly serious disadvantage is the need to keep the dragées in motion in the kettle by stirring them by hand until they no longer stick to one another or to the kettle. Another difficulty lies in that the process consumes an enormous amount of time. The dragées are required to spend a total of about two days' time in the kettle with additional time for periodic interruptions required for drying between each step in the process. In all a total of 8 to 10 days' production time is required for producing each batch of dragées.

Methods for rapidly coating pills have become known in recent years in connection with which it has been proposed that all of the substances to be applied to the pills be combined in a single, sugar-coating suspension. Such a process has, for example, been described in German Patent 1,000,569 and is carried out using a coating suspension consisting of water, sugar, starch and sodium cellulose glycolate with heat. While this process has been somewhat successful, it has not gained wide-spread usage as it produces satisfactory results only if the coating process is constantly supervised (see Gstirner, "Grundstoffe und Verfahren der Arzneibereitung," Verlag F. Enke, Stuttgart 1960, page 61). The constant supervision required represents a considerable disadvantage in comparison with the conventional coating process described hereinbefore in which the kettles do not have to be kept under constant supervision and observation.

Other rapid coating processes have been proposed which are based upon the complete elimination of the use of sugar, the coating being performed, for example, using alcoholic solutions of polyethylene glycol (see Gstirner, loc. cit., page 62). Polyethylene glycols, however, have the significant shortcoming that they are particularly bad tasting. The use of dragées produced with alcoholic solutions of polyethylene glycol is disagreeable to the patient and therefore do not offer the advantages associated with this form of drug administration.

It is accordingly the general object of the present invention to provide a method for the manufacture of dragées which are of a purity, surface smoothness, taste, and color suitable for commercial use, in an economically feasible manner.

Another object of the invention is to provide a method for the manufacture of dragées which are of a purity, surface smoothness, taste, and color which makes their use convenient and inexpensive without any disagreeableness to the patient who has to take repeated doses of the pharmaceutical contained in the dragée.

Still another object of the invention is to provide a substantially automatic method for the manufacture of dragées.

Still another object of the invention is to provide a rapid method for the manufacture of dragées.

Still a further object of the invention is to provide an apparatus for the manufacture of dragées which are of a purity, surface smoothness, taste, and color suitable for commercial use.

It is still another object of the invention to provide dragées, i.e. an improved vehicle for therapeutic compositions being characterized by stability, surface smoothness, pleasant taste, etc., and whereby the full effect of the therapeutic mechanism can be carried out when the composition is administered orally.

Still a further object of the invention is to provide coating suspensions for coating dragées, containing polyethylene glycol in addition to sugar and filler materials in aqueous suspension.

Still another object of this invention is to provide an apparatus for the manufacture of dragées which delivers an exactly controlled amount of coating suspension at any predetermined time onto pill centers moving in a rotatable coating kettle.

Other and further objects and advantages of the invention will become apparent to one skilled in the art upon referring to the accompanying disclosure and the drawing in which.

Figure 1:
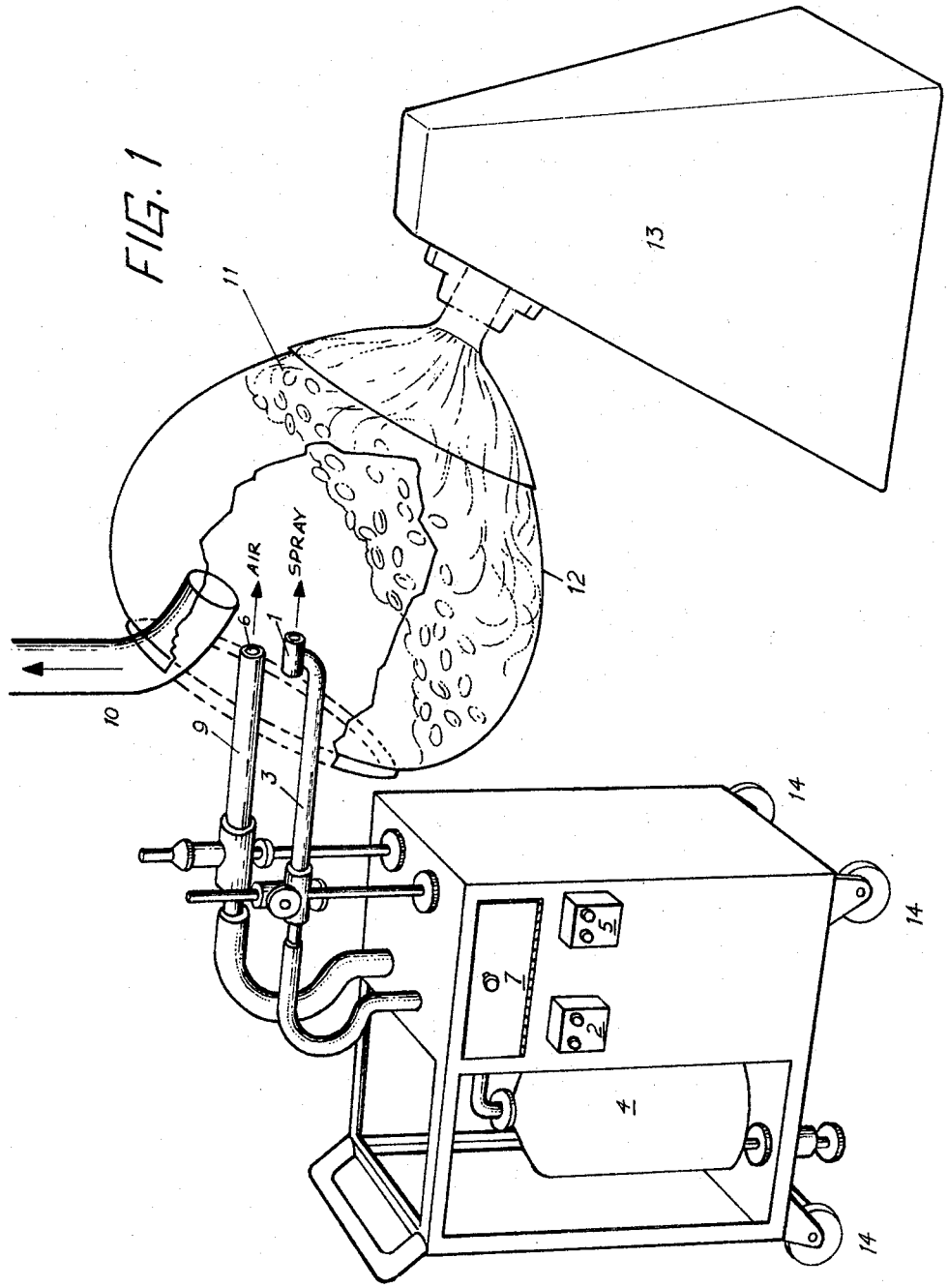
FIG. 1 is a schematic illustration of a preferred embodiment of the apparatus of the invention.

In accordance with the present invention a fully automatic rapid method for the production of dragées characterized by pleasant taste, smoothness of surface and perfect color has now been found. It has been found according to the invention that when pill centers or cores are coated using an aqueous-sugar coating suspension containing 1–10 weight percent of polyethylene glycol in addition to 40–50 weight percent of sugar and 10–20 weight percent of solid fillers, dragées are obtained characterized by the properties as just set out. In preparing the dragée, the coating suspension is sprayed onto the pills or centers maintained in rotation in a coating kettle, the spraying interrupted and the sprayed dragée centers maintained in rotation for a period of time and thereafter the coated centers dried with a current of warm air. These three steps in the sequence as set out are repeated, if necessary, until the desired total amount of coating suspension has been applied.

In this way and namely by the incorporation according to the invention of a small amount of polyethylene glycol in a sugar-containing coating suspension, the tendency to stickiness at the start of the drying of the suspension is overcome, that is the dragées do not stick to one another nor do they adhere to the kettle wall. There is, as a result, made possible a rapid, fully automatic pill center coating process. The invention makes possible for the first time the possibility in a single operation to apply the coating suspension onto the pill center and to dry the same thereon. In the process as herein taught, the need for handwork is eliminated other than that which is required for adjusting the equipment at the beginning and at the end of the process. Further, the requirement for experienced technicians to carry out the process is eliminated. Furthermore, drying ovens are no longer required whereby the frequent transporting of the dragées from the kettle to the drying oven and back which represents a serious disadvantage of the coating processes as conventionally practiced is eliminated. A further considerable advantage of the instant process is that the time required for production of a batch of dragées amounts to only about one day. In connection with the production time, it should be noted that the capacity per kettle is many times that of the conventionally practiced process. Thus, whereas in the known conventional method, the kettle charge was limited to that amount which could be kept broken up and moving by hand, the kettle in accordance with the invention can be filled to its maximum capacity. A special advantage stemming from the process of the invention lies in the fact that each coating which is applied is a relatively thin coating, is dried immediately and consequently no penetration of moisture into the center during the coating process takes place. Since smooth coatings are formed from the start, the total or over-all coating can also be much thinner than usual. The coatings in accordance with the invention amount to approximately up to 1½ times the weight of the center where formerly the coatings amounted to about twice the weight of the center.

The coating suspensions of the invention per se are novel and can be produced very simply without heat merely by stirring the components together and homogenizing the resultant suspension, for example, in a corrundum disk mill or the like. In Table 1, which follows, illustrative examples of a number of coating suspensions according to the present invention are set out. It is possible in accordance with the invention to add coloring material from the start of the process if desired, thus achieving a uniform coloration of the dragées.

TABLE 1

| Example | 1 | 2 | 3 | 4 | 5 | 6 | 7 | 8 | 9 | 10 |
|---|---|---|---|---|---|---|---|---|---|---|
| Sugar | 46 | 45 | 45 | 45 | 46 | 46 | 46 | 45 | 50 | 50 |
| Carbowax 6000 [1] | 4 | | | 5 | | 4 | | | 4 | |
| Carbowax 20,000 [1] | | 5 | 5 | | 4 | | 4 | 4.5 | | 4 |
| Starch Syrup | | 2.5 | 2.5 | 2 | | 2 | 2 | 2 | | 2 |
| Gum Arabic | | | 0.5 | 1 | 1 | | | 0.5 | | |
| Chalk | 15 | 10 | 6 | 8 | | | | | 10 | 6 |
| Kaolin | | | | 6 | | 10 | 12 | 10 | 4 | 6 |
| Talcum | | | | | 5 | | 3 | | 6 | |
| Titanium oxide | 5 | 2.5 | | | 4 | 3 | | | 2 | 2 |
| Tricalcium phosphate | | | | | | | | 8 | 6 | |
| Coloring [2] | q.s. | q.s. | q.s. | q.s. | q.s. | q.s. | q.s. | q.s. | q.s. | q.s. |
| Water to make | 100 | 100 | 100 | 100 | 100 | 100 | 100 | 100 | 100 | 100 |

[1] Trade name of polyethylene glycol.
[2] q.s. = quantum sufficit.

The following examples illustrate satisfactory procedures for the manufacture of dragées, but it is to be understood that they are presented only for the purpose of illustration and not as indicating the limits of the invention.

*Example 1*

8 kilograms of dragée centers of 6 mm. diameter (weight of centers 80 mg., number of centers 100,000) were introduced into a kettle having a 60 cm. diameter provided with a powerful exhaust system. The coating kettle was not provided with any baffles or like construction and had a substantially smooth, even, continuous, imperforate inner surface. The spraying system was adjusted so that about 80 ml. of the coating suspension were sprayed onto the centers within a period of 25 seconds in each of the coating steps. The centers were circulated, i.e. rotated for 1.5 minutes following the spraying without any external interference so that the suspension could be uniformly distributed on the surface of the dragées. The batch was then dried with a current of hot air for 2 minutes. These three steps were repeated until 8.5 kg. of suspension had been applied. The coating suspension employed was one in accordance with the invention containing polyethylene glycol in addition to sugar and solid fillers. The dragées which had smooth coatings from the start of the procedure were then ready for waxing. The total production time amounted to about 6.5 to 7 hours and no supervision of any kind was required in this period. After the coating had been completed, the dragées had a weight of 130 mg. The coating dissolved in the Erweka disintegration tester in about 4 minutes and was comparable with a very good candy coating as formed by the process as used hitherto.

*Examples 2–5*

The process of Example 1 was repeated, the data and results of these coating operations carried out in accordance with the process of the invention are set out in Table 2 which follows:

TABLE 2

| Dragée Centers | | | | 1 Spray Coating | | |
|---|---|---|---|---|---|---|
| Diam., mm. | Wt., mg. | Number | Total Wt. | Dragee Wt. (mg.) | Suspension (ml.) | Dry Weight (g.) |
| 6 | 80 | 100,000 | 8 | 130 | 80 | 56 |
| 6 | 80 | 100,000 | 8 | 115 | 60 | 42 |
| 10 | 330 | 120,000 | 39.6 | 500 | 500 | 350 |
| 9 | 360 | 120,000 | 43.2 | 560 | 450 | 315 |

| Kettle Diameter (cm.) | Spraying (a) | Pause (b) | Drying (c) | a+b+c | Total Candy Coating Time (hrs.) |
|---|---|---|---|---|---|
| 60 | 25 | 90 | 120 | 235 | 6.5–7 |
| 60 | 5 | 55 | 120 | 180 | 6.5–7 |
| 100 | 12 | 90 | 138 | 240 | 4 |
| 100 | 11 | 90 | 109 | 210 | 4 |

The rapid, fully automatic process of the invention can preferably be carried out using the novel apparatus taught in accordance with the invention.

Referring to FIG. 1, the apparatus according to the inventon which is particularly suitable for carrying out the fully automatic coating process consists of four separate systems:

(A) A spraying system composed of a spraying nozzle 1 which is connected by conduit 3, suitable valves or pumping switches 2 to a supply tank 4 containing the coating suspension;

(B) A source of heated air 6 provided with suitable switches and conduits 5 and 9 respectively, (C) An electrical control apparatus composed of a timer mechanism 7, and (D) An unmodified coating pan 12 mounted on a coating pan motor housing 13 provided with the standard means for rotataion, equipped with a powerful exhaust system 10 and filled with pill centers 11. The systems A, B and C are mounted for movement by means of wheels 14. The system D constitutes an apparatus well known in the pharmaceutical industry for use in manual coating processes and does not require any further equipment or modification.

Figure 2:
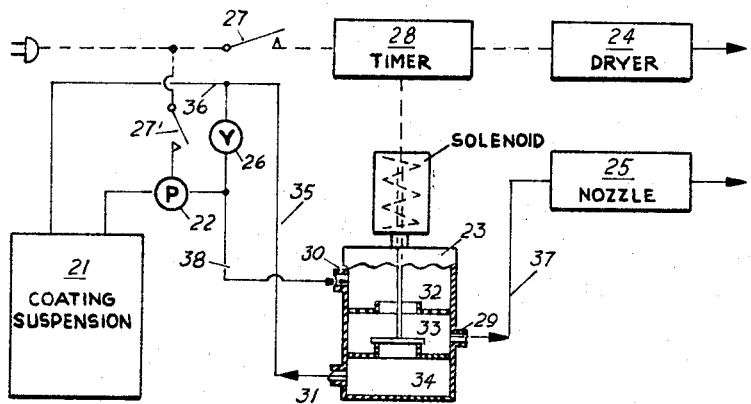
FIG. 2 is a further schematic illustration of the embodiment shown in FIG. 1 showing the combination with a pump, an electrically steered three-way valve, and an overpressure valve connected with a spray nozzle and a source of coating suspension and the interconnecting conduits.

As can be seen from FIG. 2, as soon as switch 27' is closed, a certain amount of the coating suspension is fed continuously either from the vessel 21 by means of pump 22 to the spray nozzle 25 via conduits 38 and 37 or is carried back through an over-pressure valve 26 via conduit 36 to the vessel 21. Depending on the switching position of the electrically controlled three-way valve 23, the suspension either enters the outer chamber 32 of the three-way valve 23 and leaves it at the middle chamber 33 for introduction into the spray nozzle 25 or returns from the spray nozzle 25 via the middle chamber 33 and the outer chamber 34 to the vessel 21, thereby releasing the pressure within the conduit 37 via recycle conduits 35 and 36 back toward the vessel 21. The connection of the three-way valve 23 with the conduits 35, 37 and 38 is highly unusual, because the outlet 29 of the middle chamber 33 generally is an inlet, whereas the inlet 30 of the outer chamber 32 generally is an outlet. The timer 28 controls (a) The switching position of the threeway valve by means of a solenoid, and (b) The source of warm air, for example a dryer 24, as soon as the main switch 27 is closed. Depending on the switching position of the threeway valve 23, the middle chamber 33 is either connected with the outer chamber 32 or with the outer chamber 34.

Figure 3:
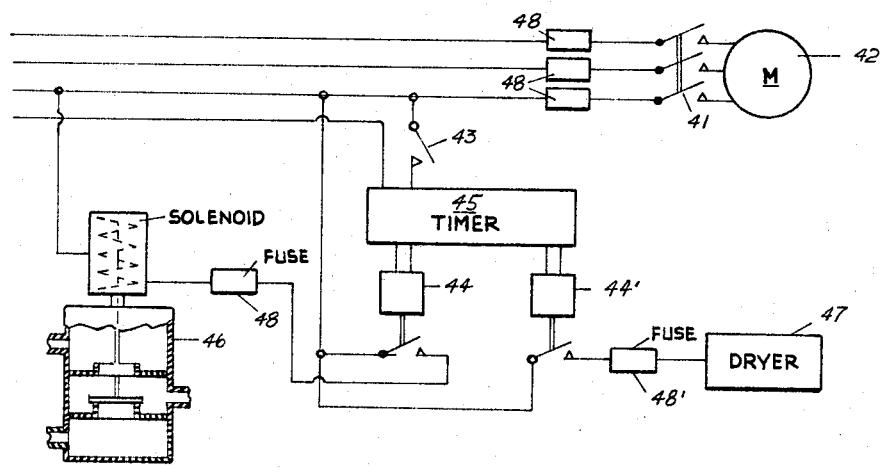
FIG. 3 is a diagrammatic representation of the wiring of an embodiment of the apparatus shown in FIG. 2.

The wiring diagram showing the relationship of the timer 28 to the remaining apparatus of FIG. 2 is shown in FIG. 3. The motor 42 of the pump 22 works continuously as soon as the safety switch 41 is closed, whereas the switches 44 and 44' are controlled by the timer 45. The switch 44 controls the three-way valve 46 by means of a solenoid, whereas the switch 44' controls the source of heated gas, for example a dryer 47, as soon as the main switch 43 is closed. It is advisable to have separate fuses 48 for the motor 42, the dryer 47 and the solenoid.

The entire apparatus is composed of a number of parts known per se, however, the very specific combination and interrelation of these parts results in a very reliable and safe apparatus for use in automatically coating dragées, particularly when using the coating suspension as described herein. In order to assure that an absolutely perfect coating of the pill centers takes place, the amount of the coating suspension, which is to be delivered onto the pill centers must be exactly controlled by the time of and for delivery of the suspension. This can be achieved by using a conventional spray gun as for example used in spray painting. The advantage of using a spray gun of this type is based on the fact that it is provided with a proportioning valve so that different amounts of coating suspension can be delivered at a constant time setting. A disadvantage, however, is that compressed air is required to be used therewith resulting in the formation of mist and vapors which must be removed from the system through an exhaust line; the mist and vapors representing suspension not deposited on the dragées and lost the processing. Another disadvantage is that spray guns are not self-feeding so that the coating suspension has to be fed positively to the gun, as, for example by gravity, i.e. from the supply vessel downwardly through suitable conduits to the gun.

For these reasons, it has proven advantageous to supply the coating suspension at a constant pressure of approximately 10 atmospheres using therefor a gear pump. As shown in FIG. 2 the coating suspension supplied from vessel 21 is permanently maintained under pressure within conduit 38 and the outer chamber 32 of the three-way valve 23, as soon as the switch 27' for the motor of the pump 22 is closed. The safety valve 26 maintains the pressure at 10 atmospheres and releases the rest of the suspension backwards to the vessel 21 via conduit 36. If the solenoid has steered the three-way valve 23 as positioned in FIG. 2, the coating suspension can flow into the middle chamber 33 and from there via conduit 37 to the spray nozzle 25. As the pressure of 10 atmospheres has already been built up within the system 38 and 32, the pressure is available at the spray nozzle 25 very quickly, when the timer signals the order to spray. When the timer signals the order for stopping the spraying, the middle chamber 33 is connected with the outer chamber 34, so that the pressure at the spray nozzle 25 is released immediately via the conduits 37, 35 and 36 backwards to the vessel 21. It is only with this specific connection of the valves and the conduits that the pressure at the spray nozzle is available immediately at the beginning and is released immediately at the end of the spraying time.

This effect cannot be achieved if at the beginning or the end of the spraying time a pump is switched on or off respectively, as then the pressure is built up or decreases only slowly. There results, however, no exact spraying at the spray nozzle, if the pressure is less than said 10 atmospheres. At for example, 5 atmospheres or at lesser pressure, the suspension comes out of the spray nozzle in form of drops and droplets or in form of a beam, so that a uniform distribution of the coating suspension onto the pill centers is not possible. According to this invention these disadvantages are avoided and it is possible to control the exact amount of suspension delivered onto the pill centers by control of time, i.e. the time and the amount of suspension delivered are exactly proportional.

Although the coating suspension of the invention generally is not inclinded to settle out, it has nevertheless proven advantageous to avoid any possible formation of sediment by agitating the suspension. Due to the circulation produced by the gear pump, via safety valve 26 and recycling conduit 36, no additional agitation is required. A further advantage of the apparatus according to this invention is, that no special coating pans are necessary and that the old, conventionally pear-shaped rotatable coating pans, which are available in almost every pharmaceutical factory for use in manual coating processes, can be used. Furthermore, it is not necessary to use a pressure tank for the source of the coating suspension. Any open vessel can be used, and therefore, if desired or necessary even without interrupting the coating process, the coating suspension can be exchanged or varied.

As a hot air source for small kettles, a hair dryer can be used. Even for large kettles, the output of a standard hand dryer is adequate (see FIGS. 2 and 3). Of course, any other hot air source can be used for drying as long as it provides the assurance that the temperature and rate of flow of the air are constant.

The timing regulation for the apparatus described above is carried out in the known manner utilizing the conventionally available electrical timers. These contain, for example, revolving cams which open and close the necessary contacts. It has proven advantageous, however, to be able to adjust accurately the spraying time, the inactive period, and the drying time, and this is done by means of three separate time switching mechanisms. When separate switching timer mechanisms are used, the running time can be adjusted during operation which is not directly possible in the case of cam-operated timers. The spraying system, the pump, the valves, conduits, switches, and the timer, and—if desired—even the source of hot air of the apparatus described above can be combined into a very practical readily movable unit as has been shown in FIG. 1 by means of the wheels 14. The apparatus is connected with single-phase or three-phase current source by means of a single cable. If the hot air unit is not built in, a control line is required for the hot air inlet. It is an advantage of the apparatus described above, that the movable unit can be removed easily for filling and emptying the coating kettle.

As used herein, and in the claims, the term "Carbowax" designates the trade name of a group of non-volatile, solid, polyethylene glycols, soluble in both water and aromatic hydrocarbons and which are manufactured by Carbide and Carbon Chemical Company, a division of Union Carbide and Carbon Corporation of New York city, N.Y. Carbowaxes are supplied in various grades, the grades being designated by numerals as shown in the specification. Increasing grade numbers indicate increasing molecular weights.

Illustrative examples of the coating suspensions according to the present invention have been shown in Table 1. Of course, many changes and variations in the components may be made by those skilled in the art in accordance with the principles set forth herein. Naturally, we make the limiting statement to the effect that the components of the coating suspension must be non-toxic, at least in the amounts in which the same are employed.

The preferred procedure for the manufacture of dragées according to the present invention has been shown in Examples 1–5. Of course, many changes in the reaction conditions, temperature and duration may be made by those skilled in the art in accordance with the principles set forth herein. The drying of the dragées is effected by means of hot air of 100–120° C., preferably. In case that the dragée center may contain some heat sensitive material, the drying may be effected also at lower temperatures, whereby the duration of that step will last longer, naturally. In general, the time ranges for each of the steps of the coating process according to the present invention depend on the size of the kettle as well as that of the dragée centers, of the humidity of the atmosphere and the like conditions. Preferably, the sprying step has a duration of 5–50 sec., the pause 10–100 sec. and the drying step 50–200 sec.

The apparatus for effecting the manufacture of the dragées according to the present invention is composed of a number of parts known per se. However, a special arrangement of those components—as shown in the accompanying drawings—is necessary to guarantee an absolutely perfect coating process.

What we claim is:

1. In an apparatus for producing coated pill centers comprising a rotatable coating kettle having substantially smooth, even, continuous, imperforate inside surfaces for receiving and holding said pill centers, means for blowing a stream of heated gas onto said pill centers, means for exhausing said heated gas after contact thereof with said pill centers, spray means for delivering a coating suspension composed of a volatile liquid and solid materials onto said pill centers, pump means for delivering said suspension from a source containing the same, conduit means connecting said spray means, said pump means and said source containing said suspension, said liquid being capable of removal together with said heated gas, switch means to control said blowing of a stream of heated gas and said spray means, and timing means set to follow a predetermined cycle, the improvement of combining (a) said pump means with a safety-valve and a recycling conduit for applying a predetermined substantially permanent pressure in said conduit between said pump means and said spray means, and (b) a solenoid steered three-chambered threeway valve for interrupting the flow of suspension between said pump means and said spray means at a predetermined time, (c) conduits interconnecting the middle chamber of said threeway valve as an outlet with said spray means, one of the outer chambers of said threeway valve as an inlet for the suspension coming from said pump means, and the other outer chamber thereof with a recycling conduit to said source of suspension in order to release backwards that amount of compressed suspension which remains within said conduit connecting said spray means and said threeway valve to the suspension source via a separate recycling conduit, as soon as the flow of suspension between said pump means and said spray means is interrupted at a predetermined time.

2. The improvement in claim 1, wherein at least said gear pump, said safety valve, said three-way valve, said conduits, said spray means, said switch means and said timing means are mounted for movement.

3. In an apparatus for producing coated pill centers comprising a coating kettle for receiving and holding said pill centers, means for blowing a stream of heated gas onto said pill centers, means for exhausting said heated gas after contact thereof with said pill centers, spray means for delivering a coating suspension composed of a solution and suspended solid materials onto said pill centers, pump means for delivering said suspension from a source containing the same, conduit means connecting said spray means, said pump means and said source containing said suspension, switch means to control the blowing of said stream of heated gas and said spray means, and timing means set to follow a predetermined cycle, the improvement of combining a gear pump with a safety valve and a solenoid steered threeway valve for interrupting the flow of suspension between said gear pump and spray means at a predetermined time, said solenoid steered threeway valve having three chambers, conduits interconnecting the middle chamber of said threeway valve as an outlet to said spray means, one of the outer chambers of said threeway valve being interconnected by conduits as an inlet for the suspension coming from said gear pump and the other outer chamber of said threeway valve interconnected by conduits with a recycling conduit to said source of suspension wherein said gear pump pumps said suspension against the mechanical force of said safety valve through said recycling conduit to said source of suspension.

4. The improvement in claim 3, wherein at least said gear pump, said safety valve, said three-way valve, said conduits, said spray means, said switch means and said timing means are mounted for movement.

References Cited

UNITED STATES PATENTS

| | | | |
|---|---|---|---|
| 2,551,329 | 5/1951 | Klemola | 118—8 |
| 2,652,805 | 9/1953 | D'Angelo | 118—19 |
| 2,810,606 | 10/1957 | Taylor | 239—127 X |
| 3,095,326 | 6/1963 | Green et al. | 118—19 X |
| 3,101,040 | 8/1963 | Lanz | 118—19 X |
| 3,141,792 | 7/1964 | Lachman et al. | 118—19 X |

CHARLES A. WILLMUTH, *Primary Examiner.*

J. P. McINTOSH, *Assistant Examiner.*